(12) United States Patent
Kim

(10) Patent No.: US 7,763,400 B2
(45) Date of Patent: Jul. 27, 2010

(54) MOTHER GLASS AND METHOD OF FABRICATING LIQUID CRYSTAL DISPLAY PANEL USING THE SAME

(75) Inventor: Jin Ha Kim, Icheon-shi (KR)

(73) Assignee: LG. Display Co., Ltd., Seoul (KR)

( * ) Notice: Subject to any disclaimer, the term of this patent is extended or adjusted under 35 U.S.C. 154(b) by 1264 days.

(21) Appl. No.: 11/001,754

(22) Filed: Dec. 2, 2004

(65) Prior Publication Data

US 2005/0123842 A1 Jun. 9, 2005

(30) Foreign Application Priority Data

Dec. 4, 2003 (KR) .................... 10-2003-0087695

(51) Int. Cl.
*G02B 5/20* (2006.01)
*G02F 1/1335* (2006.01)

(52) U.S. Cl. .......................................... 430/7; 349/106

(58) Field of Classification Search ............... None
See application file for complete search history.

(56) References Cited

FOREIGN PATENT DOCUMENTS

| JP | 2000-010088 A | * | 1/2000 |
| JP | 2002-182185 | | 6/2002 |
| KR | 2002-93201 | | 12/2002 |
| KR | 2003-37058 | | 5/2003 |
| KR | 10-0486899 | | 4/2005 |

* cited by examiner

*Primary Examiner*—John A. McPherson
(74) *Attorney, Agent, or Firm*—Brinks Hofer Gilson & Lione

(57) ABSTRACT

A mother glass and a method of fabricating a liquid crystal display panel using the mother glass provides improved color characteristics and brightness. The mother glass is provided with a plurality of color filter arrays that include at least one block pattern located at a dummy region between the color filter arrays for substantially preventing the movement of color resin on the mother glass.

9 Claims, 14 Drawing Sheets

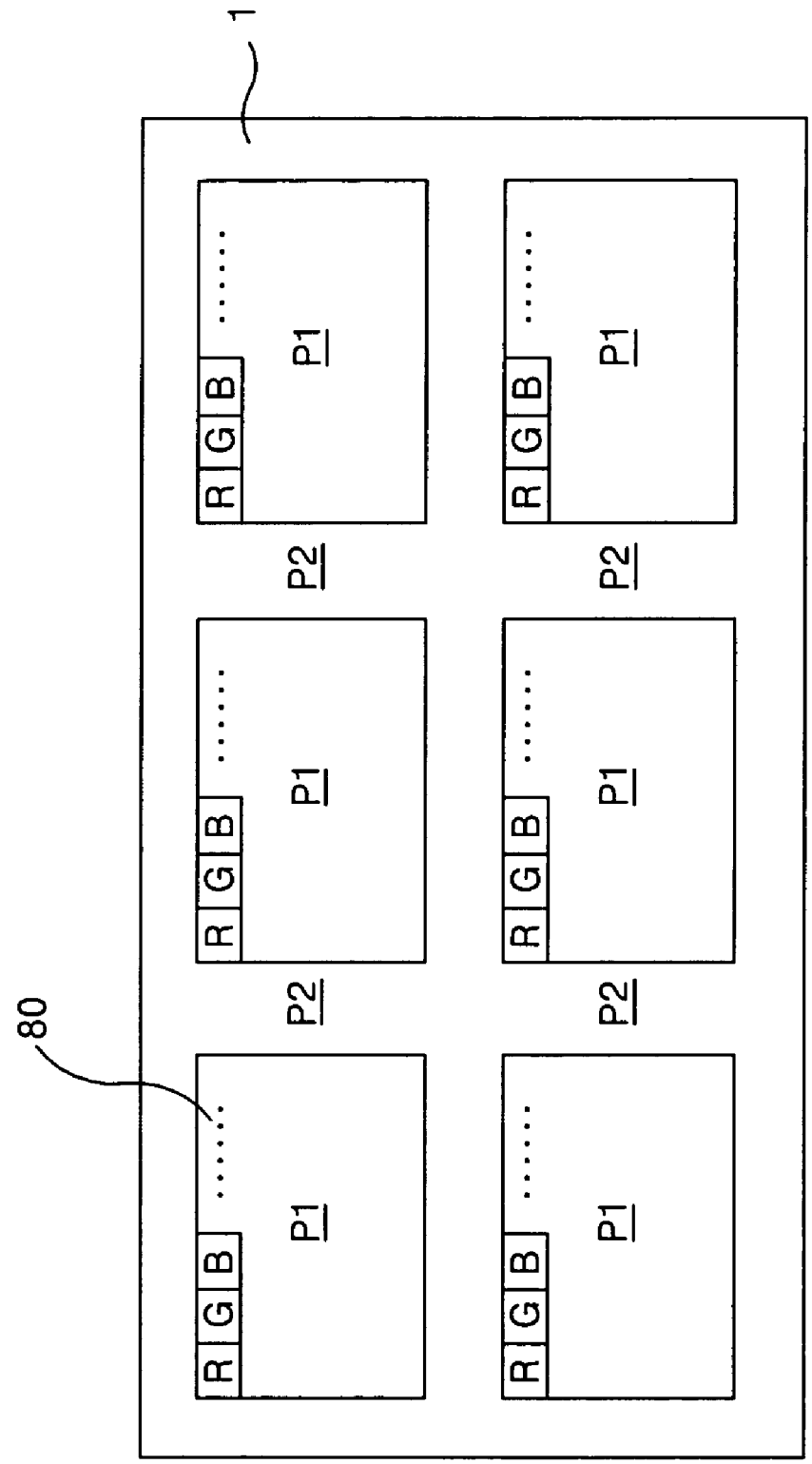

d1 ≒ d2

MOTHER GLASS AND METHOD OF FABRICATING LIQUID CRYSTAL DISPLAY PANEL USING THE SAME

This application claims the benefit of Korean Patent Application No. P2003-87695 filed in Korea on Dec. 4, 2003, which is hereby incorporated by reference.

TECHNICAL FIELD

The present invention relates to a liquid crystal display panel and, more particularly, to a mother glass and a method of fabricating a liquid crystal display panel using the mother glass that has improved color characteristic and brightness.

BACKGROUND

In general, a liquid crystal display (LCD) device controls the light transmittance of liquid crystal cells in response to video signals. In this way a picture is displayed that corresponds to the video signals on a liquid crystal display panel. To this end, the LCD device includes a liquid crystal display panel having liquid crystal cells arranged in an active matrix, and driving circuits for driving the liquid crystal display panel.

FIG. 1 is a sectional view illustrating a related art liquid crystal display panel.

Referring to FIG. 1, the liquid crystal display panel includes a color filter array substrate having a black matrix 4, a color filter 6, a common electrode 10, and an upper alignment layer 12, which are sequentially formed on an upper glass 2. A thin film transistor array substrate having a thin film transistor (TFT), a pixel electrode 16, and a lower alignment layer 42 are formed on a lower glass 32. A liquid crystal material (not shown) resides in an inner space between the color array substrate and the thin film transistor array substrate.

In the color filter array substrate, the black matrix 4 is formed on the upper glass 2 so as to correspond to the area of the TFT and the area (not shown) of gate and data lines in the thin film transistor array substrate. The black matrix 4 also partitions the cell regions at which the color filter 6 is to be formed. The black matrix 4 serves to prevent light leakage and to absorb external light, thereby improving the contrast ratio. The color filter 6 is formed over the cell region partitioned by the black matrix 4. The color filter 6 is formed by separate red (R), green (G), and blue (B) filters and represents red, green, and blue colors. A common reference voltage that drives the liquid crystal material is applied to the common electrode 10. A spacer (not shown) maintains a cell gap between the color filter array substrate and the thin film transistor array substrate.

In the thin film transistor array substrate, the TFT includes a gate electrode 38 formed on the lower glass 32 along with a gate line (not shown). Semiconductor layers 14 and 48 overlap the gate electrode 38 with a gate insulating layer 34 positioned therebetween. Source and drain electrodes 68 and 70 along with a data line (not shown) overlie the semiconductor layers 14 and 48. The TFT supplies pixel signals from the data line to the pixel electrode 16 in response to scan signals from the gate line.

The pixel electrode 16 is made of a transparent conductive material with a high light transmittance and overlies a passivation film 50 and contacts the drain electrode 70 of the TFT. After an alignment material, such as a polyimide, is applied to the upper substrate and the lower substrate, a rubbing process is performed, to form the upper/lower alignment films 12 and 42 for aligning the liquid crystal material.

The liquid crystal display panel having the above-mentioned arrangement is shown in FIG. 2. The display panel includes an upper mother glass 1 of a large size having an array region P1 and a dummy region P2. A plurality of color filter arrays 80 reside in the array region P1. A separate lower mother glass (not shown) includes a plurality of thin film transistor arrays in an array region of the lower mother glass. After forming the color filter arrays and the thin film transistor arrays, the upper and lower mother glasses are combined. Hence, a plurality of the liquid crystal display panels is simultaneously formed, to thereby promote an improvement of a production yield. Herein, the dummy region P2 of the upper mother glass 1 partitions each of the color filter arrays 80.

FIGS. 3A to 3C illustrate sequential process steps for forming a plurality of color filter arrays on the related art upper mother glass.

First, a black matrix material, for example, chrome (Cr), is deposited on the upper mother glass 1. Then, the black matrix material is patterned by a photolithography and etching process to form the black matrix 4 at the array region P1 of the upper mother glass 1, as shown in FIG. 3A.

A red resin is deposited on the upper mother glass 1 having the black matrix 4 formed thereon. Then, the red resin is patterned by way of a photolithography and etching process. Consequently, a red color filter R is formed at the array region P1. A green resin is deposited on the upper mother glass 1 having the red color filter R formed thereon. Then, the green resin is patterned by way of a photolithography and etching process. Consequently, a green color filter G is formed at the array region P1. A blue resin is deposited on the upper mother glass 1 having the green color filter G formed thereon. Then, the blue resin is patterned by way of a photolithography and etching process. Consequently, a blue color filter B is formed at the array region P1. Accordingly, the red, green and blue color filters 6 are formed at the array region P1, as shown in FIG. 3B.

As shown in FIG. 3C, the common electrode 10 is formed on an entire surface of the upper mother glass 1 having the red, green and blue color filters 6. Herein, in case of a liquid crystal display panel employing an IPS (In-Plane-Switching) mode, a planarization layer is formed on the upper mother glass 1 having the red, green and blue color filters 6.

The upper mother glass 1 having the color filter arrays 80 thereon is combined with the lower mother glass having the thin film transistor arrays thereon. After that, a scribing process is carried out to form a plurality of liquid crystal display panels.

Liquid crystal display panels formed by the process described above suffer from deterioration in that the color depth from one liquid crystal display panel to the next is not uniform. The non-uniformity is caused by thickness differences in the color filters 6 of the liquid crystal display panels, which results in uneven brightness.

More specifically, the color resin, for example, the red resin, is formed by a spinless coating method on the entire surface of the upper mother glass 1. As shown in FIG. 4A, the upper mother glass 1 is accommodated in a transferal cassette 77 and then transferred to a mask developing process. When the upper mother glass 1 is positioned in the cassette 77, the middle of the upper mother glass 1 sags as shown in FIG. 4B. As described above, when the middle of the upper mother glass 1 sags, some of the color resins at the edge of the upper mother glass 1 runs from the edge to the middle. As a result, a color resin that is thicker by a thickness d1 is formed in the middle of the upper mother glass 1. Since the resin that is patterned during the developing process also has an uneven thickness, the color filters 6 formed in the middle of the upper mother glass 1 have a greater thickness relative to the color filters 6 formed at the edge of the upper mother glass 1. As a result, the color depth between the liquid crystal display panels formed by the scribing process is not uniform and, in addition, the color depth in each of the liquid crystal display panels is not uniform. In other words, the thickness of the color filters 6 is uneven, which makes the light transmittance characteristics of the light source different. Accordingly, the color characteristics deteriorate such as the color depth of a picture represented between the liquid crystal display panels is not uniform, and the brightness is uneven due to the uneven transmittance. Especially in the case of a liquid crystal display panels employing an IPS mode, the above-mentioned problems affect the uniformity of the planarization layer formed on the color filters 6 causing the brightness to be uneven.

SUMMARY

Accordingly, it is an object of the present invention to provide a mother glass and a method of fabricating a liquid crystal display panel with the mother glass that has improved color characteristics and brightness.

In order to achieve these and other objects of the invention, in one embodiment, a mother glass having a plurality of color filter arrays arranged according to an embodiment of the present invention includes at least one block pattern located in a dummy region between the color filter arrays for preventing movement of a resin.

A method of manufacturing a liquid crystal display panel according to an embodiment the present invention includes forming a black matrix as an array region of a mother glass, and forming at least one block pattern for preventing movement of a resin in a dummy region between the array regions. A color filter is formed on the array region having the black matrix.

In another embodiment, the method further includes preparing a second mother glass having a thin film transistor array formed thereon and facing the mother glass. The mother glass and the second mother glass are combined and the combined mother glasses are cut to form a plurality of liquid crystal display panels.

In yet another embodiment of the invention, a method of manufacturing a liquid crystal display panel includes providing a substrate having a first array region spaced apart from a second array region by a dummy region. A block pattern is formed in the dummy region and a color resin is applied on the substrate. The block pattern substantially prevents the color resin from collecting on the substrate during processing.

BRIEF DESCRIPTION OF THE DRAWINGS

These and other objects of the invention will be apparent from the following detailed description of the embodiments of the present invention with reference to the accompanying drawings, in which:

FIG. 2 is a sectional view illustrating a mother glass on which a related art color filter array is formed;

DETAILED DESCRIPTION

Reference will now be made in detail to the preferred embodiments of the present invention, examples of which are illustrated in the accompanying drawings.

Hereinafter, the preferred embodiments of the present invention will be described in detail with reference to FIGS. 5 to 8.

Figure 5:
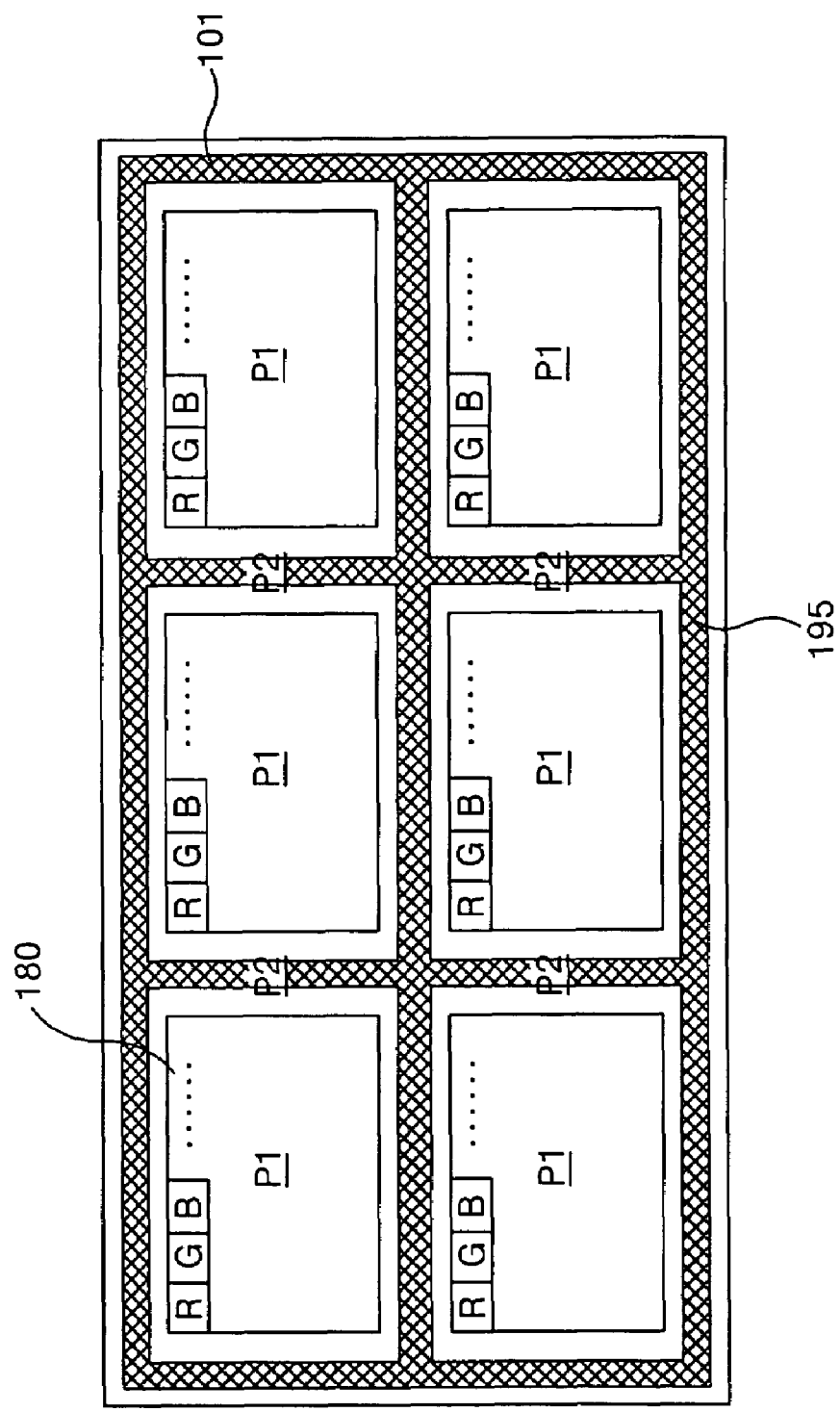
FIG. 5 is a plan view illustrating a mother glass according to an embodiment of the present invention.
Figure 6:
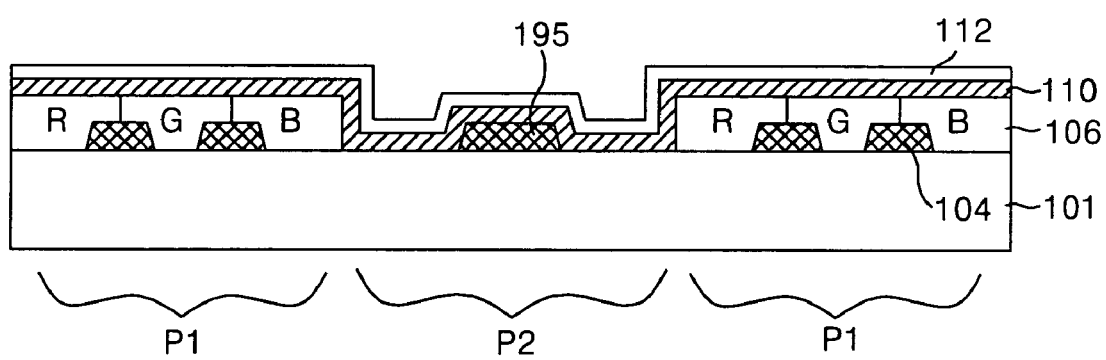
FIG. 6 is a sectional view illustrating a portion of the mother glass shown in FIG. 5.

FIG. 5 is a plan view illustrating a mother glass according to an embodiment of the present invention, and FIG. 6 is a sectional view illustrating a portion of the mother glass shown in FIG. 5.

Referring to FIGS. 5 and 6, an upper mother glass 101 is divided into an array region P1 and a dummy region P2. A color filter array resides in the array region P1. The color filter array includes a black matrix 104, a color filter 106 overlying the black matrix 104, a common electrode 110 overlying the color filter 106, and an upper alignment film 112 overlying the common electrode 110. A block pattern 195 is formed at the dummy region P2.

A thin film transistor array including a TFT, a pixel electrode and an upper alignment film on a lower mother glass (not shown).

The black matrix 104 or the upper mother glass 101 is formed at the array region P1 of the upper mother glass so as to correspond to the area of the TFT and the area of gate and data lines (not shown). The black matrix 104 also partitions the cell regions at which the color filter 106 is to be formed. The black matrix 104 serves to prevent light leakage and to absorb external light, which improves the contrast ratio. The color filter 106 is formed over the cell region partitioned by the black matrix 104 and over the black matrix 104. The color filter 106 is formed by separate red (R), green (G), and blue (B) filters and represents red, green, and blue colors. A common reference voltage is applied to the common electrode 110 to drive the liquid crystal material.

The block pattern 195 in the dummy region P2 is positioned so as to partition the upper mother glass into two area regions P1, each region having a color filter array. The block pattern 195 is preferably made of a material identical to that of the matrix 104. The block pattern 195 also serves to block color resin from running down the middle of the upper mother glass 101 during fabrication of the color filter 106. Accordingly, deterioration of color characteristics, such as uneven color depth and uneven brightness from one liquid crystal display panel to the next after the scribing process is reduced.

More specifically, the color resin, for example, the red resin, is formed by a spinless coating method on the entire surface of the upper mother glass 1 having the black matrix 104. Thereafter, when the upper mother glass 101 is accommodated in the transferal cassette 77, the middle of the upper mother glass 101 is drooped down. In the present embodiment, the block pattern 195 serves to block the color resins located at the edge of the upper mother glass 101 from running to the middle of the upper mother glass 101. In other words, under the influence of gravity the color resin runs to the sagging middle of the upper mother glass 101. The block pattern 195 is formed in the path where the color resin runs to the middle of the upper mother glass 101. As a result, a movement of the color resin is blocked. Therefore, the color resin is prevented from collecting in the middle of the upper mother glass 101.

Figure 7:
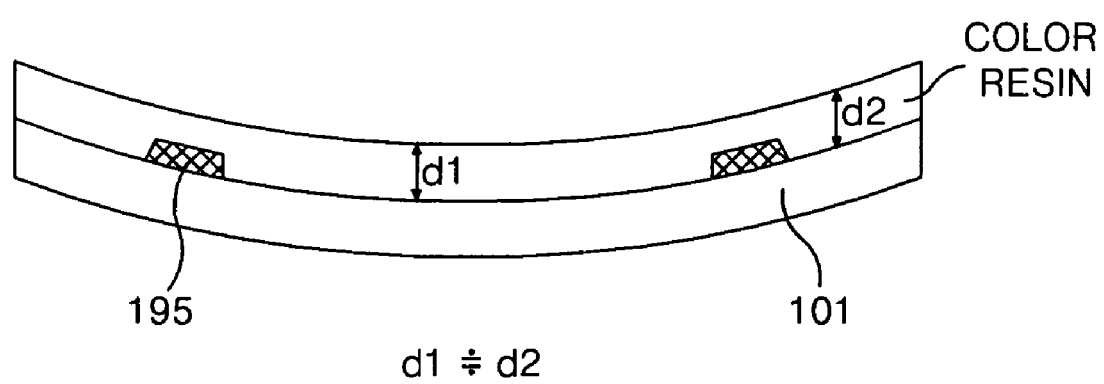
FIG. 7 is a configuration showing a color resin uniformly formed in a block pattern shown in FIG. 6.
Figure 8:
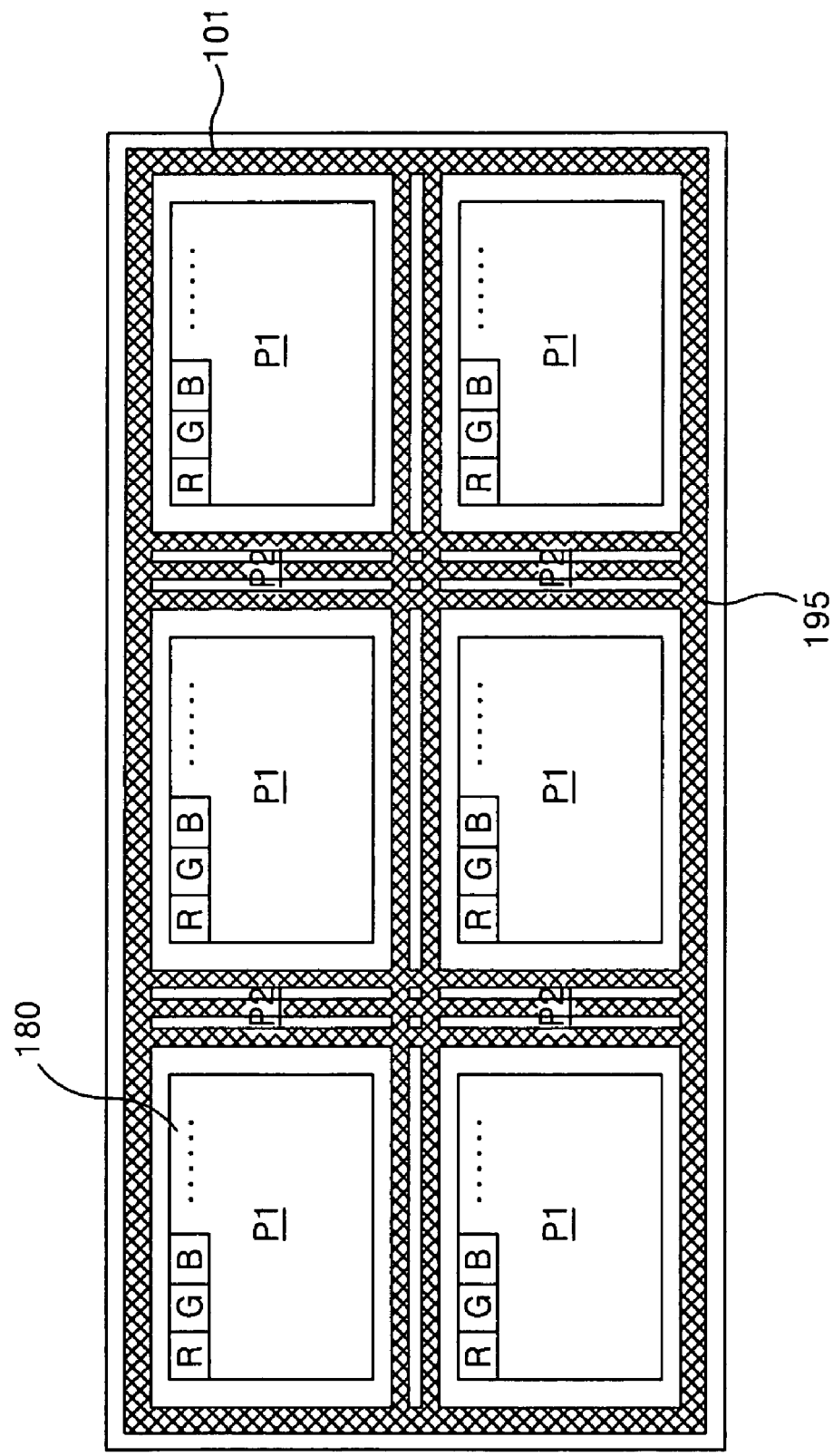
FIG. 8 is a plan view illustrating another type of mother glass according to an alternative embodiment of the present invention.

Accordingly in a process carried out in accordance with the embodiment described above, the thickness d1 of the color resin at the middle of the upper mother glass 101 is similar to the thickness d2 of the color resin at the edge of the upper mother glass 101, as shown in FIG. 7. Hence, the thickness of the color filter 106 is substantially uniform such that the transmittance of light exiting from a light source is also uniform. Thus, the color characteristics are improved such that the color depth and brightness are substantially uniform. Further, if the liquid crystal display panel operates in IPS mode, the uniformity of the planarization layer formed on the color filter 106 is also improved. As a result, brightness becomes uniform. Herein, the block pattern 195 preferably has a thickness of about 1.0 µm to about 1.5 µm, and has a line width of preferably about 40 µm to about 70 µm. In this regard, the block pattern 195 may be formed in large numbers between the color filter arrays, as shown in FIG. 8.

Figure 1:
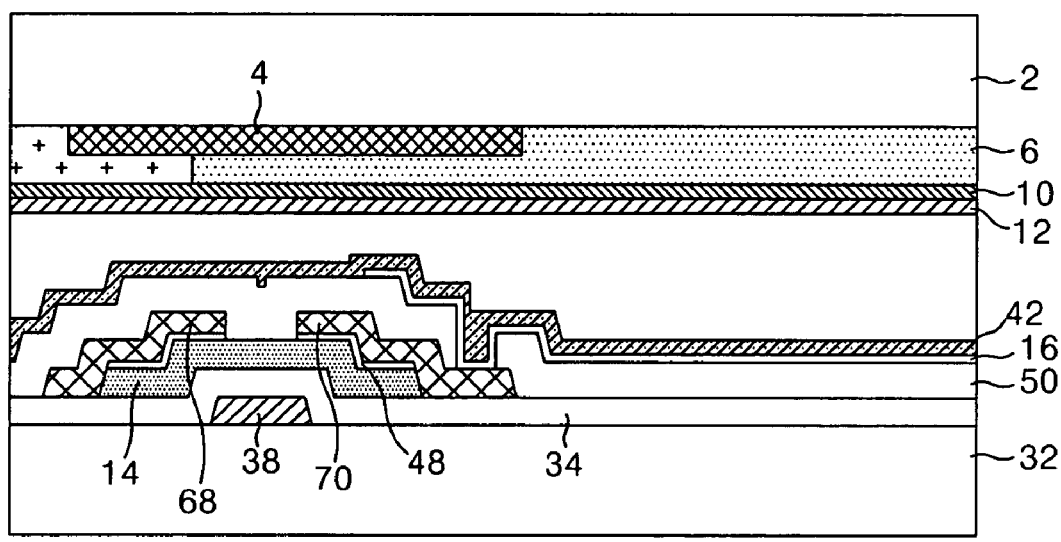
FIG. 1 is a sectional view illustrating a related art liquid crystal display panel.
Figure 3A:
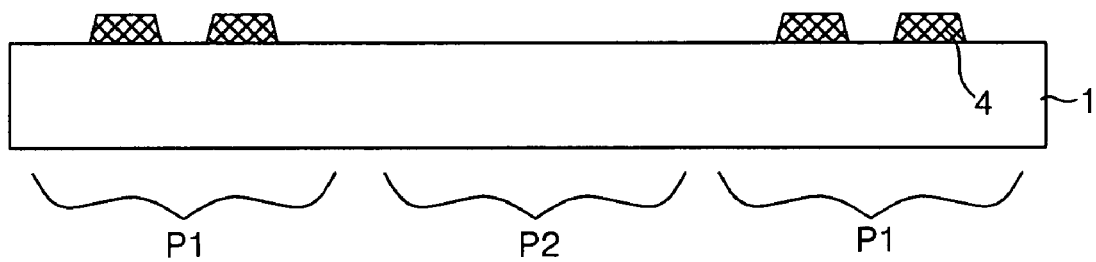
FIGS. 3A to 3C are configurations showing the formation process of the color filter array on the mother glass shown in FIG. 2.
Figure 3B:
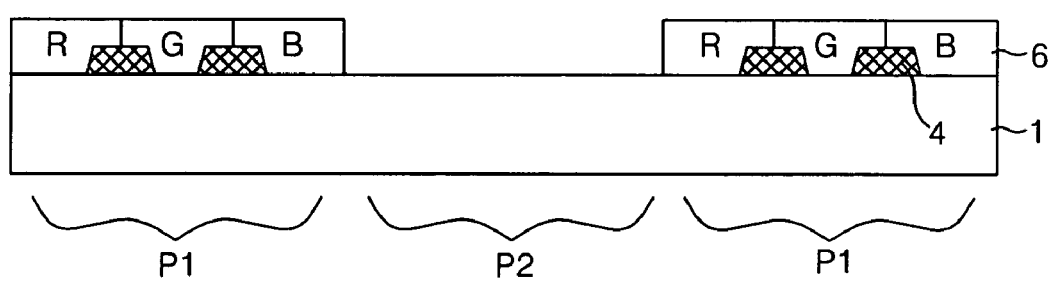
Figure 3C:
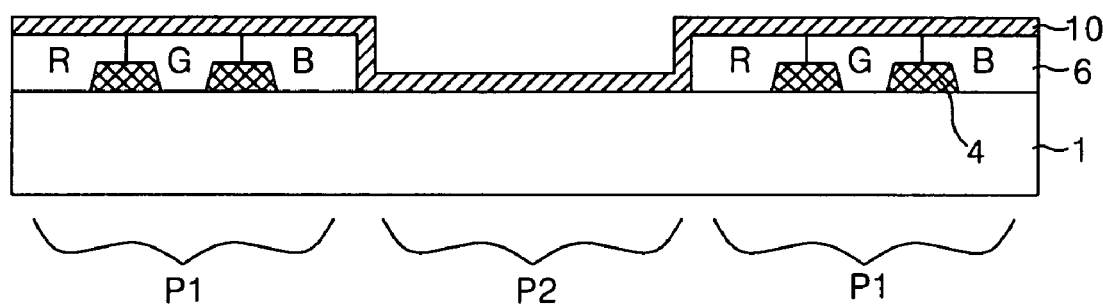
Figure 4A:
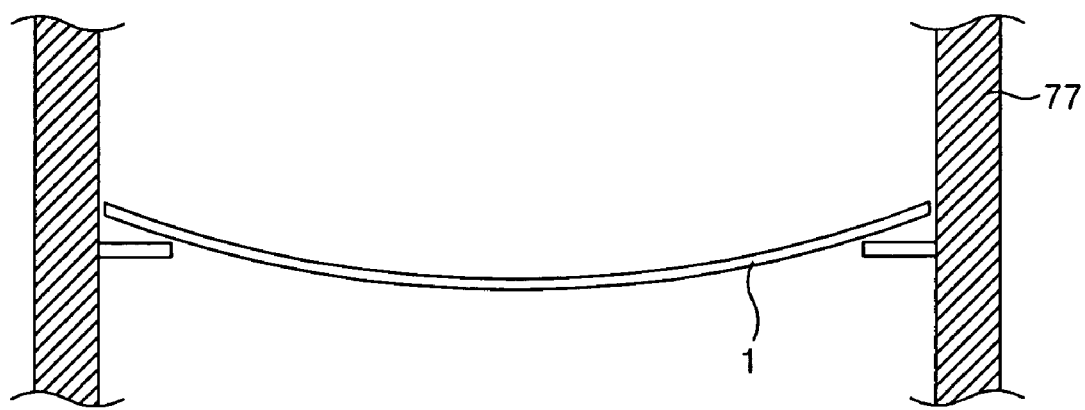
FIGS. 4A and 4B are configurations showing that the middle of the mother glass droops when the related art mother glass is accommodated in a cassette.
Figure 4B:
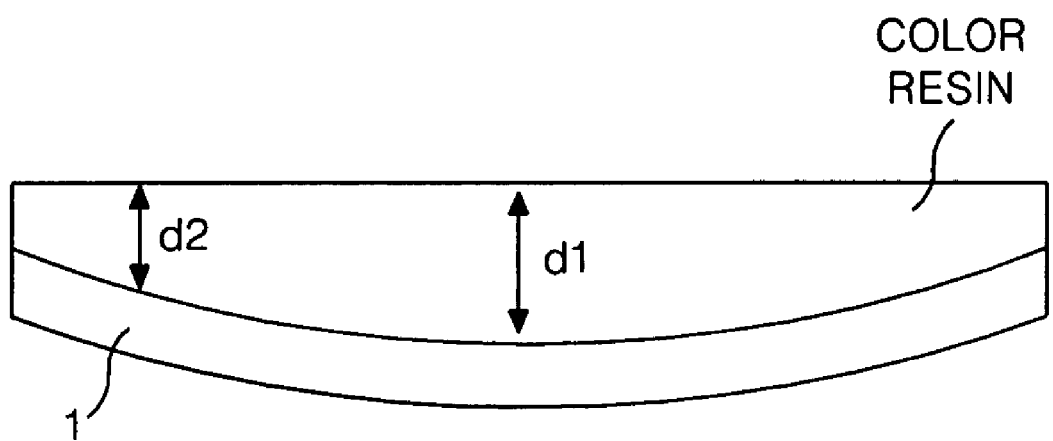

In similarity with the prior art shown in FIG. 1, a TFT is formed on the lower mother glass that includes a gate electrode formed along with a gate line. A semiconductor layer is formed to overlap the gate electrode with a gate insulating layer positioned therebetween. Source and drain electrodes are formed along with a data line with the semiconductor layers positioned therebetween. The TFT supplies pixel signals from the data line to the pixel electrode in response to scan signals from the gate line.

The pixel electrode (similar to pixel electrode 16 in FIG. 1) is made of a transparent conductive material with a high light transmittance, and contacts the drain electrode of the TFT. A passivation film separates the pixel electrode from the side insulating layer and the lower glass positioned therebetween. After an alignment material, such as a polyimide, is applied to the upper substrate and the lower substrate, a rubbing process is performed, to form the upper and lower alignment films for aligning the liquid crystal material.

After forming the alignment films, upper mother glass 101 is combined with the lower mother glass, and a scribing process is carrier out to cut the combined glasses into a plurality of liquid crystal display panels.

Figure 9A:
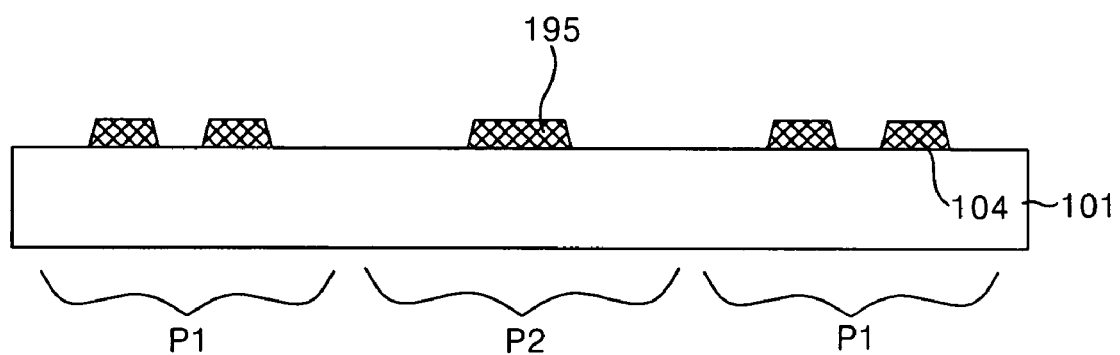
FIGS. 9A to 9C illustrate sequential processing steps of a method of manufacturing a liquid crystal display panel according to an embodiment of the invention using the mother glass shown in FIG. 6.
Figure 9B:
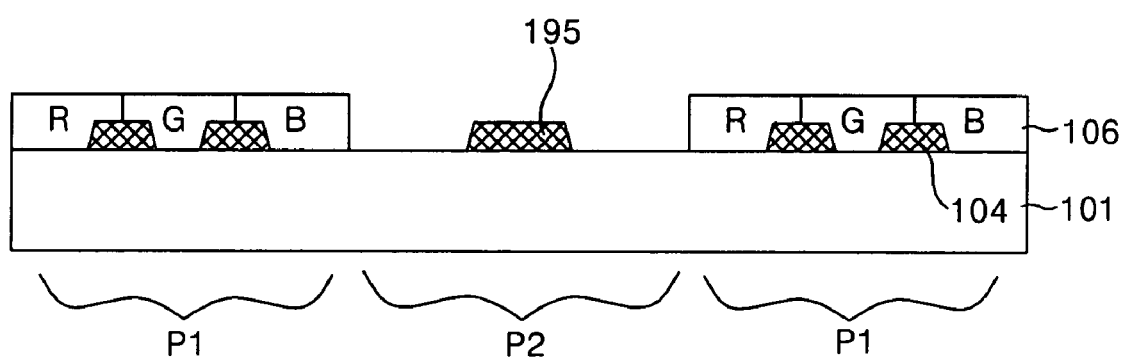
Figure 9C:
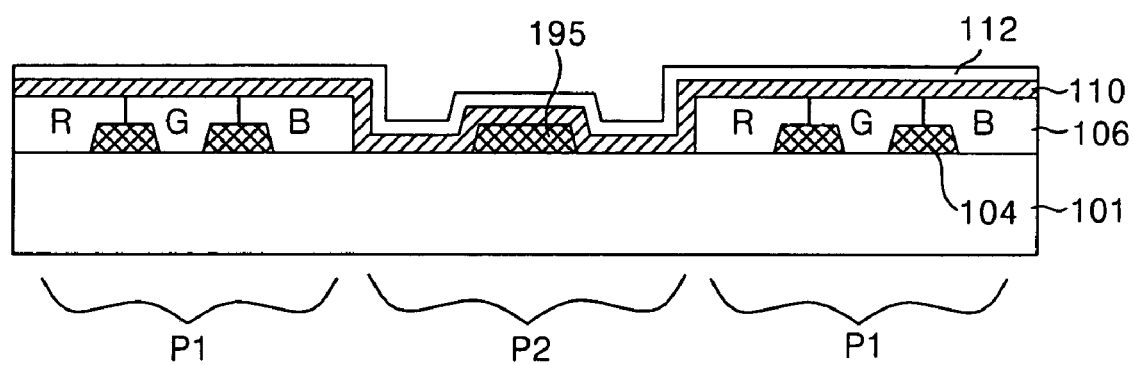

FIGS. 9A to 9C are cross-sectional views sequentially illustrating a process for forming the color filter array on the upper mother glass in accordance with an embodiment of the present invention.

First, a black matrix material, for example, chrome (Cr), is deposited on the upper mother glass 101. Then, the black matrix material is patterned by way of a photolithography and etching process using a mask to form the black matrix 104 at the array region P1 of the upper mother glass 101, as shown in FIG. 9A. Also, the block pattern 195 is formed at the dummy region P2. Herein, the protective pattern 195 has a thickness of preferably about 1.0 µm to about 1.5 µm, and has a line width of preferably about 40 µm to about 70 µm. In accordance with one embodiment of the invention block pattern 195 is formed in large numbers between the color filter arrays.

In similarity to the prior art process, a red resin is deposited on the upper mother glass 101 having the black matrix 104 formed thereon. Then, in a manner known in the art, the red resin is patterned by way of a photolithography and etching process. Consequently, a red color filter R is formed at the array region P1. A green resin is deposited on the upper mother glass 101 having the red color filter R formed thereon. Then, the green resin is patterned by way of a photolithography and etching process. Consequently, a green color filter G is formed at the array region P1. A blue resin is deposited on the upper mother glass 101 having the green color filter G formed thereon. Then, the blue resin is patterned by way of a photolithography and etching process. Consequently, a blue color filter B is formed at the array region P1. Accordingly, the red, green, and blue color filters 106 are formed at the array region P1, as shown in FIG. 9B.

As shown in FIG. 9C, the common electrode 110 is formed on an entire surface of the upper mother glass 101 having the red, green and blue color filters 106. Herein, in case of a liquid crystal display panel employing an IPS mode, a planarization layer is formed on the upper mother glass 101 having the red, green, and blue color filters 106.

The upper mother glass 101 provided with the color filter arrays is combined with a separate lower mother glass provided with the thin film transistor arrays. After that, a scribing process is performed to form a plurality of liquid crystal display panels.

The method of manufacturing the liquid crystal display panel in accordance with an embodiment of the present invention forms the block pattern 195 at the dummy region P2 of the upper mother glass 101. The block pattern 195 serves to prevent the color resin at the edge of the upper mother glass 101 from running down to the middle of the upper mother glass 101 during fabrication. Hence, the thickness of the color filter 106 remains uniform, so that transmittance of light exiting from a light source is substantially uniform. Thus, the color characteristics have improved brightness and uniformity.

As described above, in one embodiment of the present invention the mother glass and the method of manufacturing the liquid crystal display panel using the mother glass provides a, block pattern that blocks the color resin from running to the middle of the upper mother glass during fabrication. Accordingly, the thickness of the color filter of the respective liquid crystal display panels partitioned after performing a scribing process is substantially uniform and the transmittance of light exiting from a light source is also substantially uniform. As a result, the color characteristics are improved such that the color depth and brightness are substantially uniform.

Although the present invention has been described with respect to certain preferred embodiments and illustrated in the drawings described above, it should be understood by the person of ordinary skill in the art that the invention is not limited to the illustrated embodiments, but rather that various changes or modifications are possible without departing from the spirit of the invention. Accordingly, the scope of the invention shall be determined by the appended claims and their equivalents.

What is claimed is:

1. A mother glass comprising:
   a plurality of color filter arrays each including a black matrix and a color filter;
   at least one block pattern formed in the path where a color resin runs to the middle of the mother glass; and a common electrode and an alignment film formed on an entire the mother glass having the color filter and the block pattern, wherein the block pattern comprises the same material as the black matrix, wherein the path is located at a dummy region between adjacent color filter arrays, wherein the block pattern and the black matrix are formed simultaneously, wherein the block pattern is positioned so as to partition the mother glass into each region having the color filter array, wherein the block pattern serves to block the color resin from running down the middle of the mother glass during fabrication of the color filter, and wherein the color resin is prevented from collecting in the middle of the mother glass.

2. The mother glass according to claim 1, wherein the block pattern has a thickness of 1.0 μm to about 1.5 μm.

3. The mother glass according to claim 1, wherein the block pattern has a line width of about 40 μm to about 70 μm.

4. A method of manufacturing a liquid crystal display panel comprising:

forming a black matrix at an array regions of a mother glass and forming at least one block pattern in the path where a resin runs to the middle of the mother glass for substantially preventing movement of the resin;

forming a color filter in the array region; and forming a common electrode and an alignment film on an entire the mother glass having the color filter and the block pattern, wherein the block pattern comprises the same material as the black matrix, wherein the path is located at a dummy region between the array regions, wherein the block pattern and the black matrix are formed simultaneously, wherein the block pattern is positioned so as to partition the mother glass into each region having the color filter array, wherein the block pattern serves to block the color resin from running down the middle of the mother glass during fabrication of the color filter, and wherein the color resin is prevented from collecting in the middle of the mother glass.

5. The method according to claim 4, wherein the block pattern has a thickness of about 1.0 μm to about 1.5 μm.

6. The method according to claim 4, wherein the block pattern has a line width of about 40 μm to about 70 μm.

7. The method according to claim 4, further comprising:

preparing a second mother glass having a thin film transistor array formed thereon and facing to the mother glass;

combining the mother glass and the second mother glass; and cutting the combined mother glasses to form a plurality of liquid crystal display panels.

8. A method of manufacturing a liquid crystal display panel comprising:

providing a substrate having a first array region spaced apart from a second array region by a dummy region;

forming a black matrix in the first and second array regions;

forming at least one block pattern in the dummy region applying a color resin on the substrate forming a color filter in the substrate; and forming a common electrode and an alignment film on an entire the substrate having the color filter and the block pattern, wherein the block pattern substantially prevents the color resin from collecting on the substrate during processing, wherein the block pattern and the black matrix are formed simultaneously, wherein the block pattern comprises the same material as the black matrix, wherein the block pattern is positioned so as to partition the mother glass into each region having the color filter array, wherein the block pattern serves to block the color resin from running down the middle of the mother glass during fabrication of the color filter, and wherein the color resin is prevented from collecting in the middle of the mother glass.

9. The method according to claim 8 further comprising subjecting to substrate to bending conditions during processing.

* * * * *